Sept. 15, 1970  D. B. REID ET AL  3,528,571
CLAMPING MECHANISM FOR ROTARY CAR DUMPER
Filed March 13, 1969  5 Sheets-Sheet 1
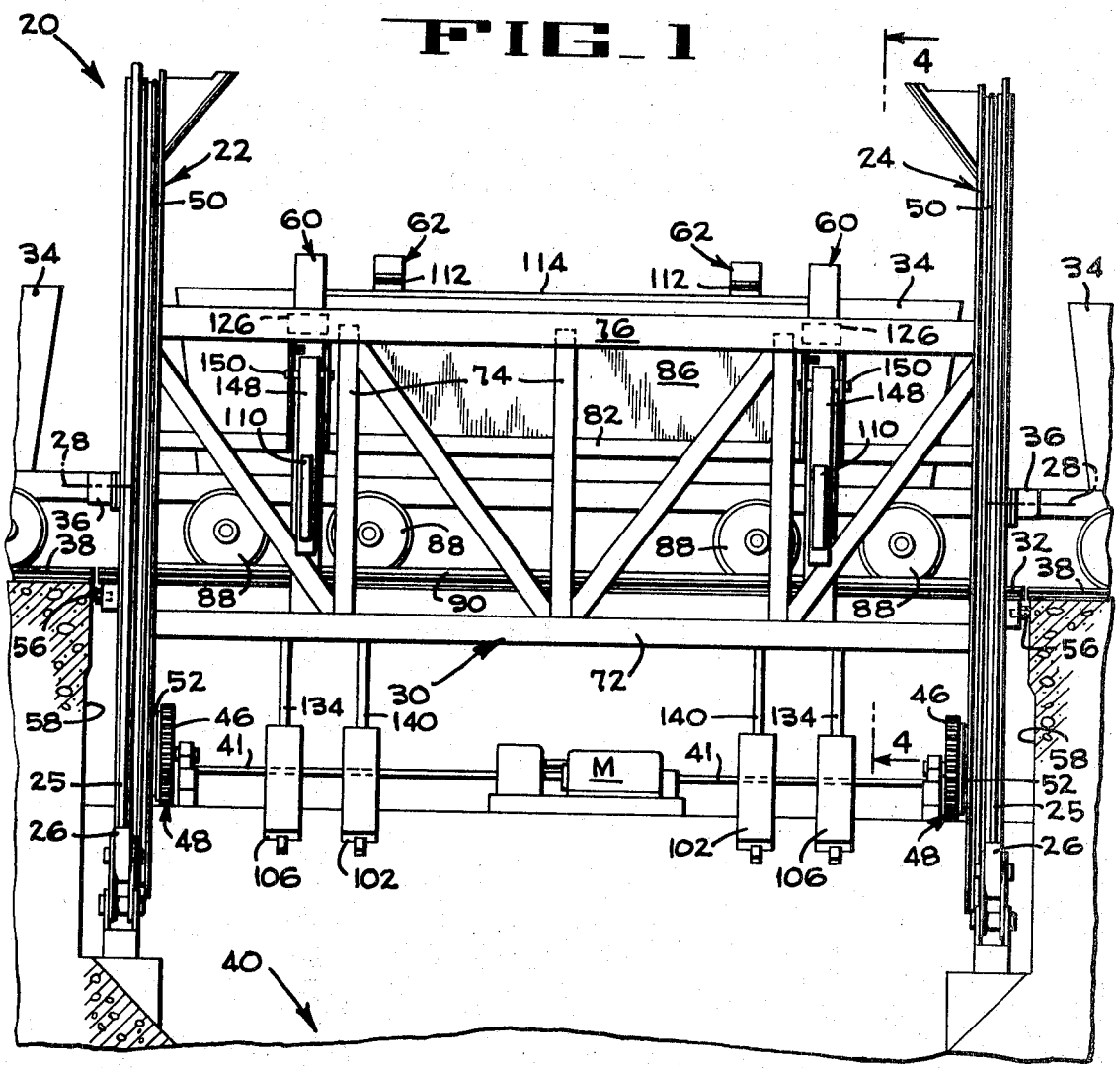
FIG_1
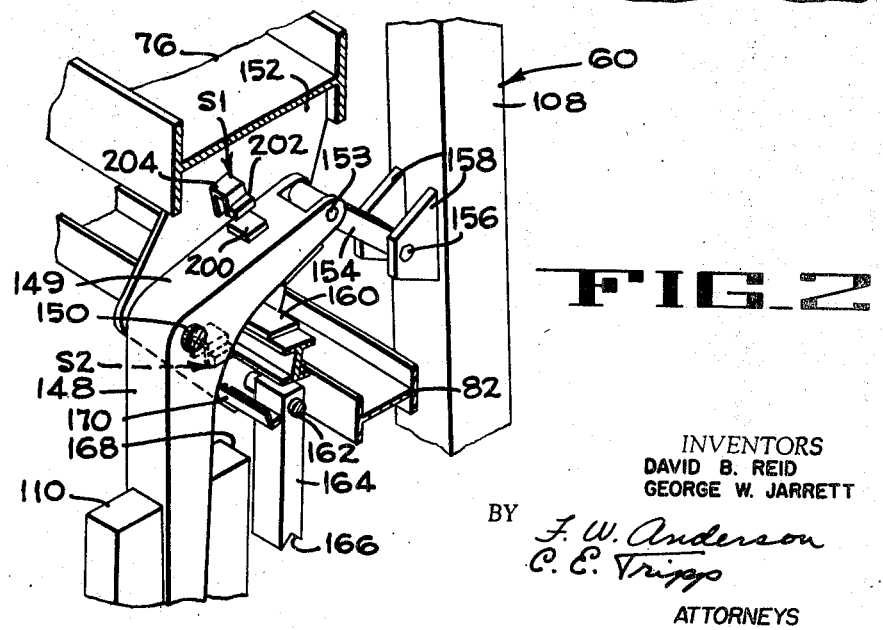
FIG_2
INVENTORS
DAVID B. REID
GEORGE W. JARRETT
BY F. W. Anderson
C. E. Triggs
ATTORNEYS

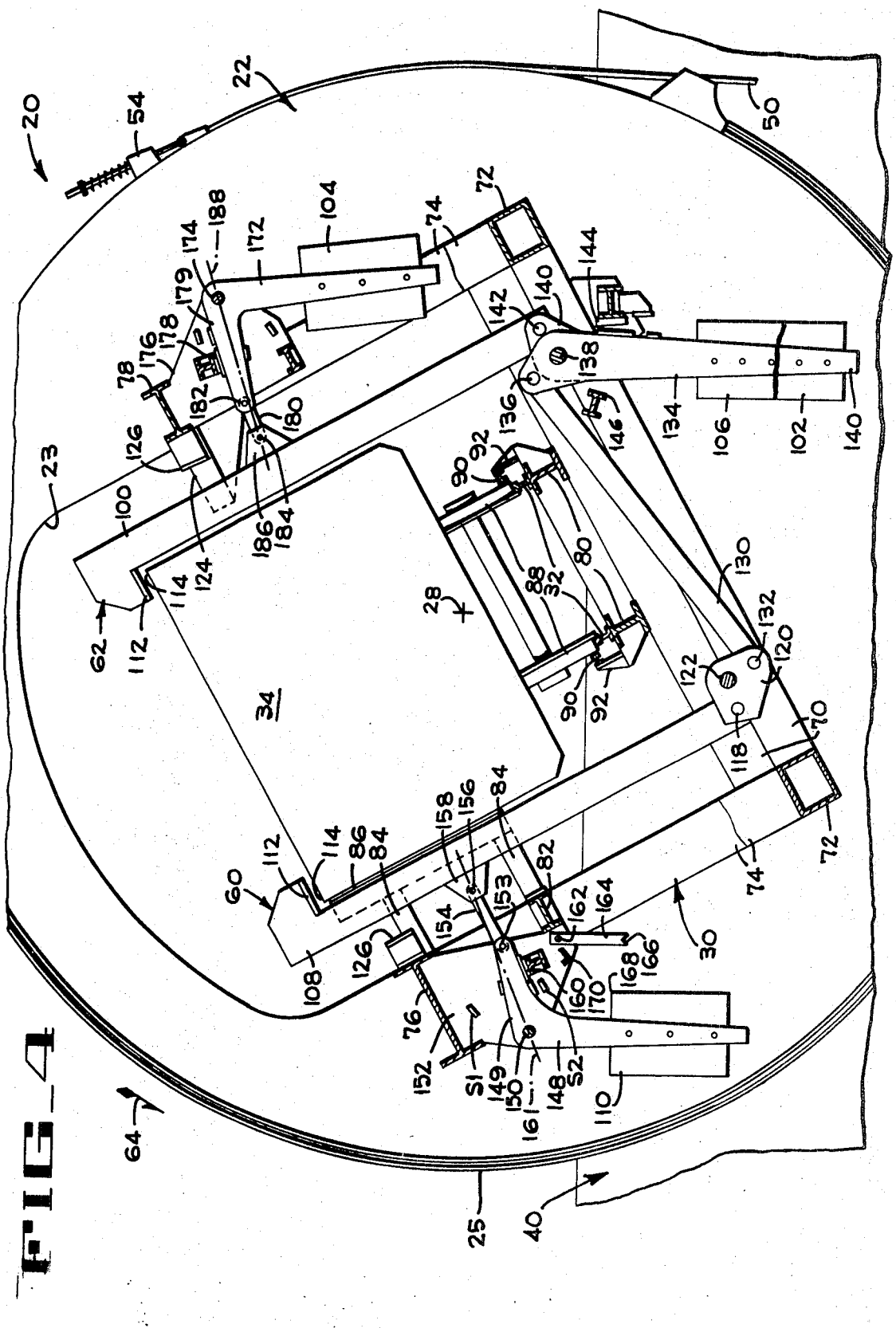

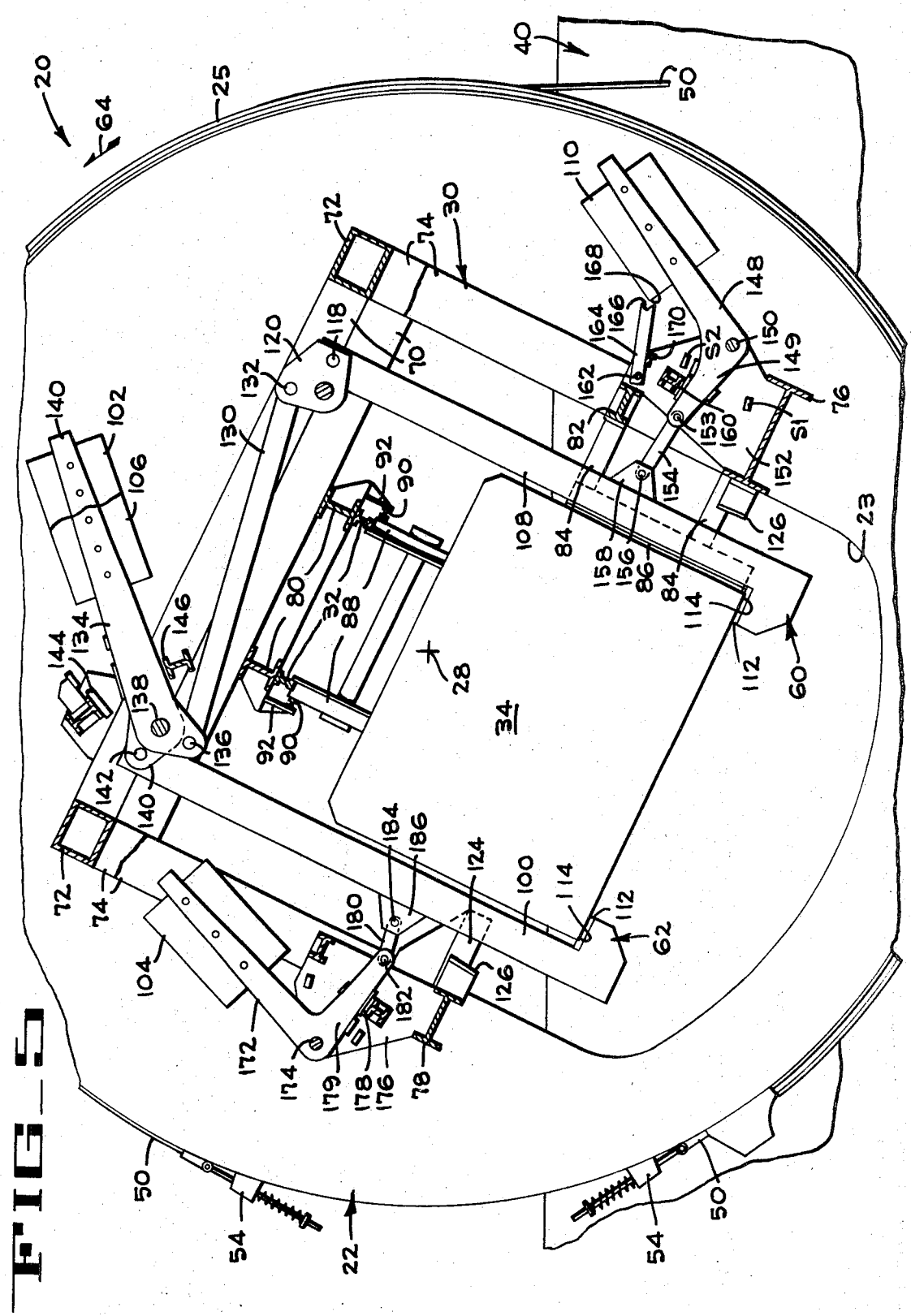

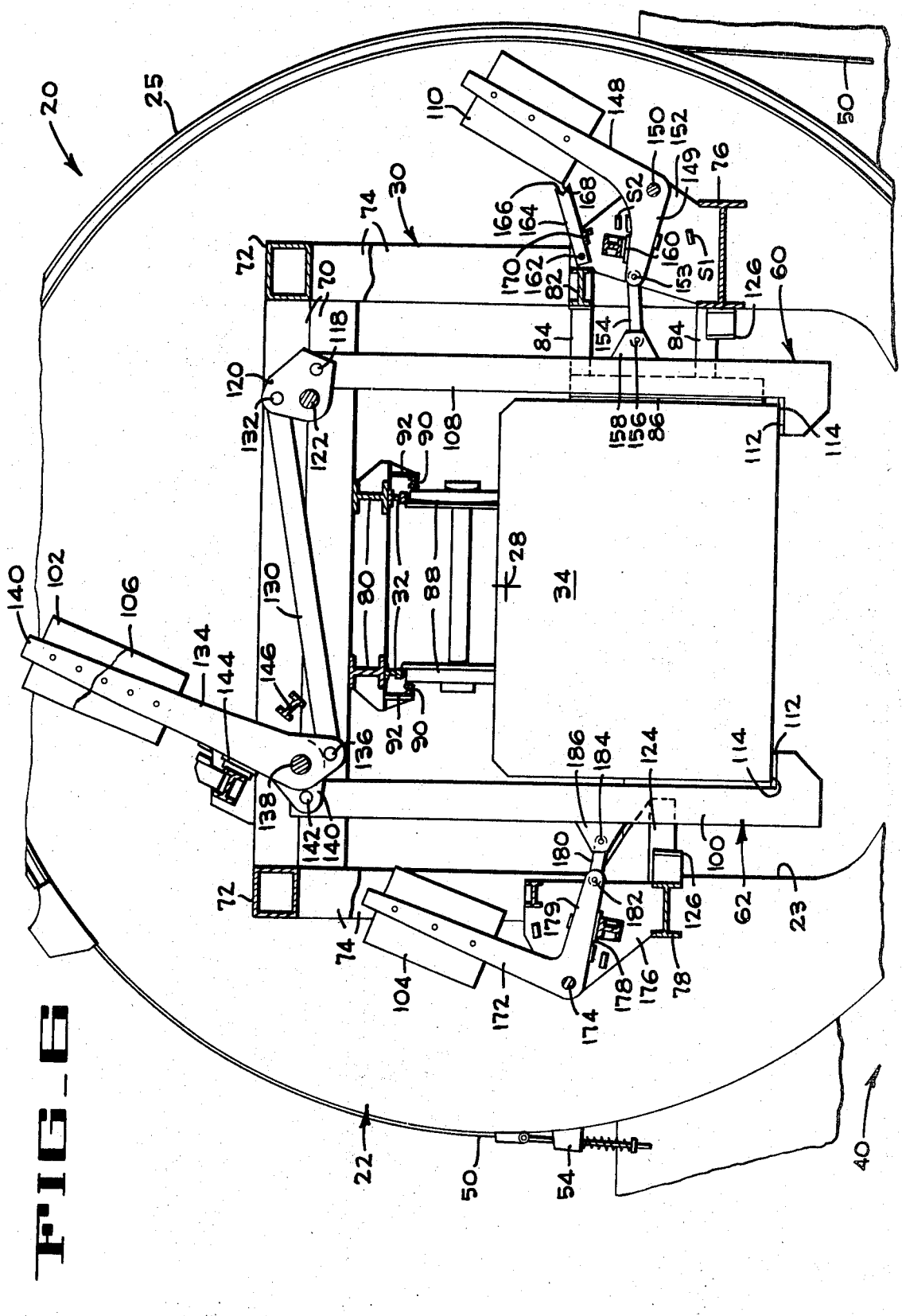

United States Patent Office 3,528,571
Patented Sept. 15, 1970

3,528,571
CLAMPING MECHANISM FOR ROTARY CAR DUMPER
David B. Reid, Toronto, Ontario, and George W. Jarrett, Brampton, Ontario, Canada, assignors to FMC Corporation, San Jose, Calif., a corporation of Delaware
Filed Mar. 13, 1969, Ser. No. 806,924
Int. Cl. B65g *67/54*
U.S. Cl. 214—55                    8 Claims

ABSTRACT OF THE DISCLOSURE

The clamps which support an inverted railcar in the rotatable cradle of a rotary car dumper are each gravity-actuated with dual counterweights attached to the cradle. As the cradle and car are rotated from an upright position, one counterweight moves a clamp over the side of the car, and then the other counterweight for the same clamp draws the clamp downward onto the upper edge of the car. Sensing switches prevent inversion of the car unless each clamp is closed to a position over the car sides and the toggle linkages connecting the counterweights to the clamps are in the over center position preventing release of the clamps while the car is inverted. Sensing switches also indicate by warning light or alarm if the clamps have not withdrawn from the car permitting its removal.

BACKGROUND OF THE INVENTION

The present invention concerns rotary car dumpers wherein a railroad car is positioned in a rotatable cradle and then inverted to dump its contents. More particularly, the invention concerns the clamping mechanisms which retain the inverted car in position in the cradle.

It has previously been proposed to provide automatic, gravity operated locking clamps for the purpose noted above, one example being shown in U.S. Pat. 2,465,502. Sometimes the locking clamps are operated by a massive counterweight remotely located relative to the rotatable cradle, as in U.S. Pat. 1,439,866. The present trend is for the locking clamps to be power driven, either directly or by relative motion between the rotating clamps and some fixed attachment point. In all cases, foolproof operation of the locking clamps is an object of high priority because of the possible disastrous results if the clamps are not positively locked when the loaded car is inverted. This problem is particularly acute in some environments. For example, the contents of coal or ore cars operating in extremely cold climates sometimes freeze solid to the body of the car and will not dump when inverted. This places the gross weight of the loaded car, a weight of perhaps 200–300 tons, directly onto the locking clamps. Thus, while safe locking clamps are an absolute requirement for all rotary car dumpers, the practical achievement of such without directly or indirectly applied power actuation has heretofore been limited to car dumpers which operate under conditions more favorable than extremely cold climate use where counterweighted locking clamps might be prone to malfunction. Accordingly, a general object of the present invention is to provide gravity-operated locking clamps which are automatically operable and safe in all, including sub-zero, temperatures.

SUMMARY OF THE INVENTION

The inventive concept of the present invention includes that of first, providing individual counterweights for each locking clamp assembly to supply adequate working force for the clamp, and second, separately controlling each of the two major movements of each clamp-toward the side of the car, and down onto the top edge of the car— with a separate counterweight to further increase the working force so that there is no possibility of the movable elements of the clamp freezing fast. Further, according to the concept, is the provision of individual over-center toggle linkage which positively retains the clamps in locked position once they are set and the car remains inverted, and electrical sensing switches individual to the multiple parts of each clamp to disable the inverting movement if all clamps do not lock up in the initial portion of the inverting cycle, and to signal the operator that the car cannot be safely removed because one or more clamps have not unlocked.

BRIEF DESCRIPTION OF THE DRAWINGS

FIG. 1 is a diagrammatic side elevation of a rotary car dumping apparatus employing the locking clamps of the present invention.

FIG. 2 is an enlarged diagrammatic fragmentary detail of a typical sensing switch installation used in the FIG. 1 car dumper.

FIGS. 4–6 are enlarged diagrammatic fragmentary sections taken along lines 4—4 on FIG. 1, and illustrate successive operational steps occurring during inversion of a car to dumping position.

DESCRIPTION OF THE PREFERRED EMBODIMENT

Figure 3:
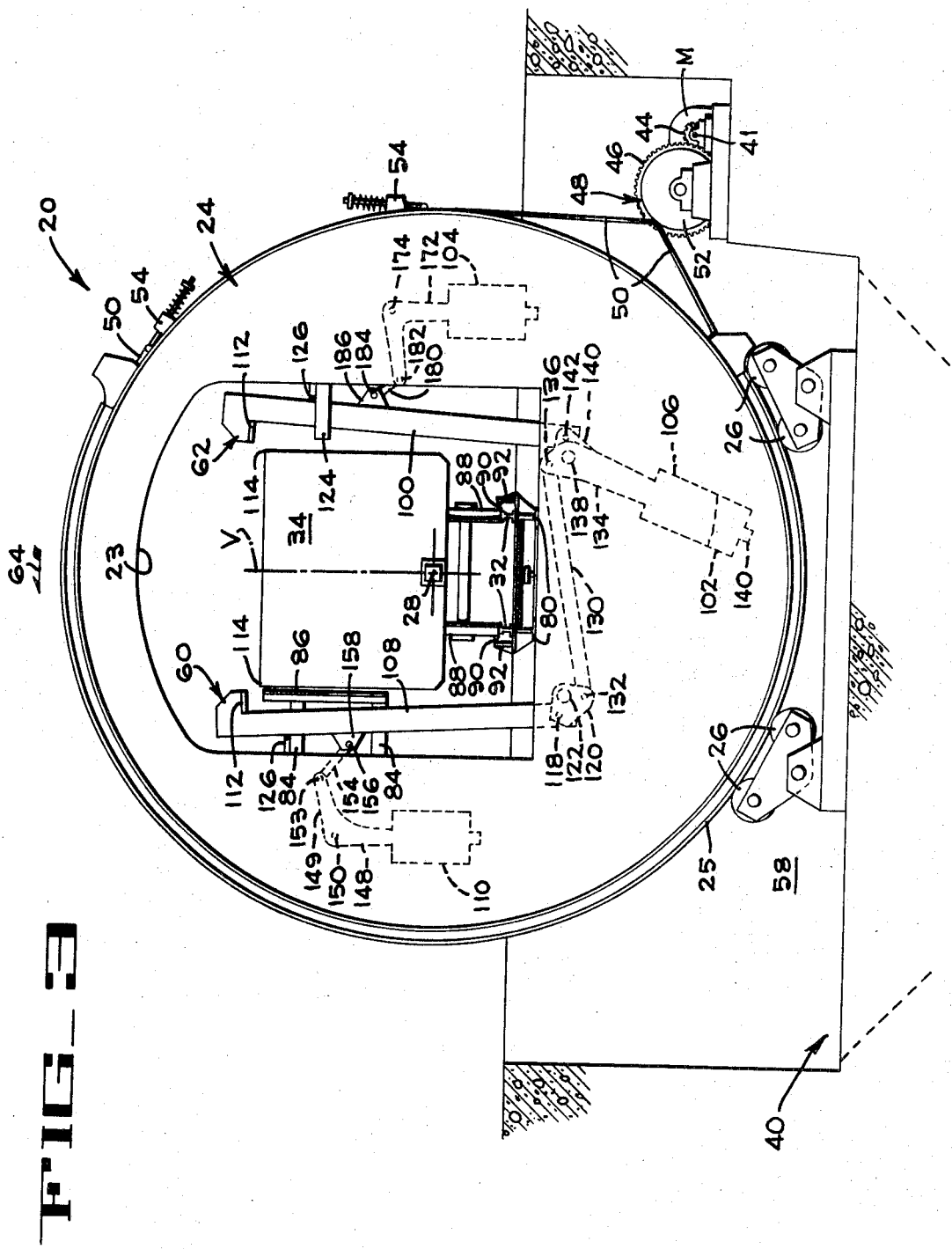
FIG. 3 is a diagrammatic end elevation of the apparatus shown in FIG. 1.

A typical rotary car dumper 20 (FIGS. 1 and 3) includes circular cradle ends 22 and 24 that are each provided with an aperture 23 to permit ingress and egress of a locomotive and its cars. Each cradle end is supported by means including a track 25 that extends partially around the cradle end and is supported upon trunnion wheels 26 at each side of a vertical reference line V. The reference line intersects the longitudinal rotational axis 28 of the cradle ends 22 and 24. A transversely U-shaped cradle or frame 30 interconnects the ends and carries rails 32 to support an open top railcar 34. In the particular rotary dumper shown, the railcars 34 are coupled with rotatable couplings 36 which allow inversion of the cars in the rotary car dumper 20 without uncoupling them from the train.

The rails 32 form a coplanar extension of the rails 38 at ground level, and span a pit 40. Inclined walls or the like, not shown, funnel the material dumped from the railcar 34 onto a subposed conveyor belt. Power for rotating the car dumper 20 is supplied by a reversible electric motor-gear reducer unit M which has power shafts 41 that each terminate near one of the cradle ends 22 and 24. As shown in FIG. 3, a pinion gear 44 on each shaft 41 drives a large ring gear 6 which is part of a cable winch 8. A cable 50 of each winch is spirally wound on a drum 52 and has free ends secured by anchors 54 to the associated cradle end 22 or 24 so as to rotate the car dumper when the motor is energized. Endwise movement of the car dumper is limited by rollers 56 (FIG. 1) that are mounted on the cradle ends 22 and 24 near the ends of the rails 32, and bear against thrust plates, not shown, that are mounted on the end walls 58 of the pit 40. As thus far described, the car dumper 20 is in accord with other car dumpers presently in use.

When a railcar is properly positioned lengthwise in the car dumper 20 for dumping, the car is clamped downward onto the rails 32, while it is being inverted. In the present instance, this clamping is effected by two clamp assemblies 60 on the dump side of the car, and by two clamp assemblies 62 on the opposite side. These clamps are automatically actuated by gravity after the operator of the car dumper energizes the motor M to rotate the car dumper in the direction of the arrow 64 (FIG. 3), and the structural arrangement and operation of the clamp assemblies forms the subject matter of the present invention.

As illustrated diagrammatically, and with particular reference to FIGS. 1 and 4, the U-shaped cradle or frame 30 includes transverse beams 70 which are joined at each end to longitudinal beams 72. Columns 74 extend upward from the beams 72 and on the dumping side of the car dumper 20, support a large-section I-beam 76. On the opposite side of the railcar 34, a similar but smaller I-beam 78 is supported by the beams 74. The longitudinal members are secured to the circular cradle ends 22 and 24, and the cradle 30 includes other conventional structural braces and supports such as a pair of track support beams 80 (FIG. 4) that support the rails 32.

In order to secure the railcar 34 as it is tilted toward a dumping position as in FIG. 4, the I-beam 76 and a similar adjacent beam 82 have inwardly projecting struts 84 which rigidly support a planar wall 86 proximate the adjacent side wall of the railcar 34. When the railcar is initially positioned in the car dumper 20, as shown in FIG. 3, there is approximately 2 inches of lateral clearance between the wall 86 and the side wall of the car, and the car side wall gravitates into supported contact with the wall 86, as the dumper is rotated, without disturbing the engagement of its wheels 88 with the rails 32. In a later described inverted position of the rail car, the wheels 88 leave the rails but are maintained in alignment therewith by auxiliary rails 90. The rails 90 are mounted alongside the wheels 88 on brackets 92 which are secured to the track support beams 80.

Each of the two clamp assemblies 62 (FIGS. 1 and 3) incorporates the same structure, as do each of the two clamp assemblies 60, and each clamp is independently operable by gravity. For this purpose, each clamp assembly 62 includes an upright clamp arm 100 which is movable endwise by a counterweight 102, and is movable laterally by a counterweight 104. In exact alignment with the counterweight 102 is a counterweight 106 which provides the force for actuating, in an endwise direction, a clamp arm 108 of the clamp assembly 60. Lateral movement of the clamp arm 108 is effected by a counterweight 110.

As the car dumper 20 (FIG. 3) is rotated in the direction of the arrow 64, the counterweights 104 and 110 pivot the clamp arms 100 and 108 toward the railcar 34 to position an inwardly projecting clamp pad 112 on each clamp arm over the upper edge at 114 of the adjacent side wall of the car. The counterweights 102 and 106 then move the clamp arms 100 and 108 endwise to engage the clamp pads 112 with the edges 114. Before the railcar 34 is inverted, linkages associated with the counterweights and clamp arms move toggle fashion to over-center positions that positively lock the clamp arms.

With reference to FIGS. 2 and 4, the clamp arm 108 is secured by a pivot pin 118 to a bell crank 120. A pivot stud 122 mounts the bell crank 120 to the transverse beams 70. Lateral guides for the clamp arm 108 are formed by one or more pairs of the struts 84 in straddling relation with the clamp arm, the nearest strut of each pair being broken away in FIG. 4. A similar arrangement is provided for the clamp arm 100 by a strut 124 and an adjacent strut that is broken away. Mounted between the struts 124, and also between the opposite struts 84, is a stop member 126 that limits pivotal movement of the clamp arm 100 or 108 in a direction away from the railcar 34.

Again referring to the bell crank 120, an elongate link 130 is secured to the bell crank by a pivot pin 132, and to a counterweight arm 134 by a pivot pin 136. The latter arm carries the counterweight 106 and is pivoted to the transverse frame members 70 by a pivot shaft 138. Mounted on the same pivot shaft 138 is a counterweight arm 140 which supports the counterweight 102. As shown in dotted lines in FIG. 3, the counterweight arms 134 and 140 (FIG. 4) depend at an angle of about 22 degrees from a vertical plane intersecting the pivot stud 138 when the car dumper 20 is upright, and gravitationally attain a vertical position independent of one another when the car dumper is rotating toward its dumping position. Consequently, in attaining the rotative position of FIG. 4, the link 130 is urged in a direction turning the bell crank 120 counterclockwise from its initial position, whereby the clamp arm 108 moves downward relative to the railcar 34. In a similar manner, the clamp arm 100 moves in the same direction and an equal distance, the main difference being that the counterweight arm 140 which carries the counterweight 102 acts directly on the clamp arm via a pivot pin 142. Due to the nonvertical positions of the counterweight arms 134 and 140 when the car dumper is upright, the clamp arms 108 and 100 are positively lifted by the counterweights to provide entry clearance for a railcar.

Swinging movement of both of the counterweight arms 134 and 140 is limited by a stop member 144 which maintains the arms at the previously stated 22 degrees from vertical position when the car dumper 20 is upright. Another stop member 146 acting as an overtravel stop is contacted by both of the counterweight arms 134 and 140 when the car dumper has rotated about 44 degrees from its initial position only if no railcar is in the dumper. Before this time, at the stated 44 degree position, relative movement between the counterweights 102, 106 and the cradle 30 ceases and, the clamp pads 112 are fully seated on the edges 114 of the side walls of the railcar 34. Before a 29 degree rotative position is attained, the clamp arms 100 and 108 are swung inwardly against the sidewalls of the car by the counterweights 104 and 110, by means of the operating sequence and structure next described.

Counterweight 110 (FIGS. 2 and 4) is carried by a crank arm 148 which is secured by a pivot shaft 150 to a pair of spaced mounting plates 152, only one of which is shown. The mounting plates depend from the I-beam 76 and are also secured to the longitudinal beam 82. The inner end portion 149 of the crank arm 148 carries a pivot shaft 153 and is coupled to the clamp arm 108 by a toggle link 154, a pivot shaft 156 and bracket plates 158 that are welded to the clamp arm. Clockwise pivotal movement of the counterweight crank arm 148 about the pivot shaft 150 is limited by a stop member 160 which extends between the two mounting plates 152. The stop member 160 is contacted by the inner end portion 149 of the crank arm 148 when the car dumper 20 has rotated to its FIG. 4 position, about 29 degrees from its initial upright position, at which time the clamp arm 108 is parallel to the wall 86 which supports the side wall of the railcar. Further, the pivot shaft 153 lies below an imaginary reference line 161 which intersects the pivot shafts 150 and 156, and counterclockwise rotation of the car dumper beyond its FIG. 4 position causes the counterweight 110 to urge the counterweight crank arm 148 against the stop member 160 to maintain the toggle action which prevents the clamp arm 108 from moving away from its inner, locked position.

Pivoted at 162 to the mounting plates 152 is a gravity operated locking link 164, the notched end 166 of which is arranged to lie near a corner 168 of the counterweight 110 when the car dumper 20 is inverted as shown in FIG. 5. A stop 170 supports the locking link with the notched end 166 in alignment with the corner 168, and the locking link prevents rebound of the counterweight 110 if the car dumper stops abruptly in its inverted position.

The counterweight 104 is mounted in a manner similar to that in which the counterweight 110 is mounted. Thus, the counterweight 104 is carried by a crank arm 172 which is mounted on a pivot shaft 174. A pair of mounting plates 176, only one being shown, are secured to the I-beam 78 and support the pivot shaft 174 as well as a stop member 178. The stop member arrests an inner end portion 179 of the crank arm 172 when the car dumper has rotated slightly beyond 22 degrees from its FIG. 3 upright position. A toggle link 180 and pivot shafts 182 and 184 connect the crank arm 172 to a bracket 186 of the clamp arm 100. By the time the car dumper has rotated about 22 degrees from its initial position, the pivot shaft 182 is above an imaginary reference line 188 which includes the pivot shafts 174 and 184 to provide a toggle-action lock maintaining the clamp arm 100 in locked position adjacent the side wall of the railcar. Also, the inner end portion 179 of the crank arm 172 is held in contact with the stop member 178 by the counterweight 104 even after the railcar 34 is rotated to its FIG. 5 inverted dumping position.

As previously mentioned, the normal dumping position for the railcar 34 is illustrated in FIG. 5. At this point the railcar has rotated about 155 degrees from its initial position, and the material in the car will normally drop freely into the pit 40. Accordingly, the reaction force on the railcar 34 is essentially that force which is produced from the weight of the counterweights 102 and 106. However, if the material is frozen into a solid mass and frozen to the interior surfaces of the car, it may not dump with the railcar in its FIG. 5 normal dumping position. In this case, the operator can fully invert the car to the position shown in FIG. 6, where the full weight of the contents of the railcar act to release the frozen mass as it thaws out.

In the position illustrated in FIG. 6, the force resisted by the counterweights 102 and 106 and by the counterweight arms 134 and 140 against counterweight stops 144 is the gross weight of the laden railcar. A feature of the invention is that the counterweights 102 and 106 will not provide sufficient force through the counterweight arms 140 and 134 to the clamp arms 100 and 108, respectively, to keep the railcar seated on the rails 32. In other words, the laden car lifts the counterweights 102 and 106 so that their arms 140 and 134 contact the stop member 144. As a result, the clamp arms 100 and 108 move lengthwise away from the rails 32 and the railcar gradually drops a distance of about 1½ inches. Meanwhile, because the springs for the trucks of the car are free of the weight of the car, they expand and push the wheels 88 toward the rails 32. Consequently, even though the car drops the stated 1½ inches, the wheels 88 maintain a closely spaced relation with the rails 32, and are maintained in alignment therewith by the auxiliary rails 90 so that the railcar is readily reseated on the rails 32 when the car dumper is returned toward its FIG. 3 upright position.

Referring again to FIG. 5, it will be noted that the gravity operated locking link 164 will pivot free of the counterweight 110 before the counterweight arm rotates about its pivot shaft 150 as the car dumper resumes its upright position. The counterweight force retaining the clamp arm 108 in its inward, locked position is therefore undisturbed, and the clamp arm 100 is similarly operated by the counterweight 104. Further, the clamp arms will urge the railcar upward toward the rails 32 after release of frozen material as described in connection with FIG. 6, and the counterweight arms 134 and 140, therefore, move away from the stop member 144 as the car dumper is rotated back to its initial position.

A feature common to each of the counterweights which operate the clamp assemblies 60 and 62 is the provision of electrical sensing switch units S2 which are effective to prevent inversion of the railcar 34, from a position about 30 degrees advanced beyond the FIG. 3 position, unless all of the counterweight linkages are properly set. Also, similar sensing switches S1 are provided to sense the locked or unlocked condition of the counterweights. As best shown in FIG. 2 for the switch S1, each sensing switch includes a ceramic magnet 200 which is secured to a movable member—in this case the counterweight crank arm 148—and a magnetically-operated proximity switch 202. The proximity switch is adjustably mounted on a fixed bracket 204 in a position in which the interspacing of the magnet and switch is within the working range at which the magnetic flux will actuate the contacts of the switch. Preferably, this spacing is at least 1½ inches to prevent possible damage to the switch.

When the car dumper is to be returned to an upright position, all switches S1 must be actuated, signifying that none of the counterweights is stuck in a locked position. If all switches S1 are not released in this manner, the switch associated with a stuck counterweight energizes an alarm visible and/or audible to the operator to indicate that the car should not be removed from the car dumper until the malfunction is corrected. It will be recognized, however, that the safety switches S1 and S2 will infrequently, if ever, perform their intended function because the dual counterweight actuation of each locking clamp assembly provides more than adequate force for positively locking and unlocking the clamp arms.

Although the best mode contemplated for carrying out the present invention has been herein shown and described, it will be apparent that modification and variation may be made without departing from what is regarded to be the subject matter of the invention.

What is claimed is:

1. In a rotary car dumper including railcar support tracks mounted on a transversly U-shaped cradle rotatable from an initial upright position to a substantially inverted car dumping position, clamping means for locking a railcar in said cradle comprising an upright clamp are mounted on said cradle adjacent each side of a car positioned therein, each clamp arm having an inwardly projecting clamp pad adapted to overlie the adjacent upper edge of the sidewall of the railcar, first counterweight means operable by gravity as said cradle moves toward an inverted position to move said clamp arms sidewise, said clamp pads being thus placed into overlying relation with the upper edge of the car when the cradle is moved to a first rotative position toward said dumping position, and second counterweight means operable to move said clamping arms substantially lengthwise to position said clamp pads adjacent the upper edge of the car when the cradle is advanced beyond said first position to a second rotative position.

2. Apparatus according to claim 1 wherein said first counterweight means includes an individual counterweight for each of said clamp arms, and individual linkage interconnecting each counterweight with its associated clamp arm, the clamp arms being thus actuated independently of one another to increase their reliability at freezing temperatures.

3. Apparatus according to claim 2 wherein said second counterweight means includes an individual counterweight for each of said clamp arms, each counterweight being movable between locked and unlocked positions between spaced stop members on said cradle, the combined force of said second counterweights being sufficient to support an empty inverted railcar but insufficient to support a loaded car when the cradle is inverted, a loaded car which has its contents frozen thereto and incapable of being dumped reacting against said counterweights by means of said clamp arms to position said counterweight means against one of said stop members, said clamp arms being thus displaceable endwise only a limited distance for retaining the wheels of the fully inverted and laden car in close proximity to the rails.

4. Apparatus according to claim 1 and toggle linkage interconnecting said first counterweight means and said clamp arm, said linkage being arranged to operate with a toggle action to lock said clamp arm from sidewise movement when the car dumper is in and beyond said first rotative position.

5. Apparatus according to claim 2 and a gravity operated locking link pivotally mounted adjacent said first counterweights, said locking link being arranged to swing into a position, when said car dumper is arrested in said dumping position, in which said locking link prevents rebound of said first counterweights.

6. Apparatus according to claim 1 and a swing arm pivotally mounted to the cradle for carrying said second counterweight means, a stop member mounted on said frame to limit the swinging movement of the arm carrying said second counterweight means, and linkage interconnecting said clamp arms and said second counterweight means, the weight of a laden car pivoting said swing arm into contact with said stop member to immobilize said clamp arms in an endwise direction and arrest the laden car.

7. Apparatus according to claim 1 wherein individually operable clamping means are located adjacent each end of the car, and means for retaining the wheels of the railcar in alignment with the support tracks when said cradle is inverted and the railcar wheels leave the tracks due to unloading of the spring suspension of the wheels.

8. In a rotary car dumper including a frame rotatable from an initial upright position to a substantially inverted car dumping position, clamping means for locking a railcar to said frame comprising an upright clamp arm pivoted at its lower end portion to said frame adjacent one side of a car positioned thereon, said clamp arm having an inwardly projecting clamp pad adapted to overlie the adjacent upper edge of the car, first gravity operated counterweight means pivoted to said frame, second gravity operated counterweight means pivoted to said frame, and over-center linkages means independently interconnecting each of said counterweight means with said clamp arm, said first counterweight means being operable to pivot said clamp arm sidewise to place said clamp pad into overlying relation with the upper edge of the car when the cradle rotates toward said dumping position, said second counterweight means being operable to move said clamp arm substantially lengthwise to position said clamp pad adjacent the upper edge of the car when the cradle rotates toward said dumping position, thus positioned, said linkage means being locked over center to prevent unlocking of said clamping means while the car is inverted in a dumping position.

References Cited
UNITED STATES PATENTS

| | | | |
|---|---|---|---|
| 2,465,502 | 3/1949 | White | 214—55 |
| 3,373,829 | 3/1968 | Suman et al. | |

ROBERT G. SHERIDAN, Primary Examiner

PO-1050
(5/69)

UNITED STATES PATENT OFFICE
CERTIFICATE OF CORRECTION

Patent No. 3,528,571  Dated September 15, 1970

Inventor(s) D.B. REID et al

It is certified that error appears in the above-identified patent and that said Letters Patent are hereby corrected as shown below:

Column 2, line 53 - change "6" to --46--.
Column 2, line 54 - change "8" to --48--.

Signed and sealed this 31st day of August 1971.

(SEAL)
Attest:

EDWARD M. FLETCHER, JR.
Attesting Officer

WILLIAM E. SCHUYLER, JR.
Commissioner of Patents